United States Patent [19]
Cecil et al.

[11] Patent Number: 6,020,569
[45] Date of Patent: Feb. 1, 2000

[54] WELDING SYSTEM WITH A REAL-TIME WELD QUALITY DETECTION SENSOR

[75] Inventors: Dimitrios G. Cecil, 4370 Charing Way, Bloomfield Hills, Mich. 48304; Jeremy J. Curcuri, Southfield, Mich.

[73] Assignee: Dimitrios G. Cecil, Bloomfield Hills, Mich.

[21] Appl. No.: 09/061,965

[22] Filed: Apr. 17, 1998

[51] Int. Cl.⁷ .................................. B23K 9/10; B23K 9/12
[52] U.S. Cl. ........................................ 219/109; 219/86.41
[58] Field of Search ................................. 219/86.41, 109, 219/89, 110; 336/130, 136

[56] References Cited

U.S. PATENT DOCUMENTS

| | | |
|---|---|---|
| 4,419,558 | 12/1983 | Stiebel. |
| 4,542,277 | 9/1985 | Cecil ........................................ 219/109 |
| 4,667,158 | 5/1987 | Redich .................................... 336/130 |
| 4,684,778 | 8/1987 | Cecil. |
| 4,861,959 | 8/1989 | Cecil. |
| 4,954,776 | 9/1990 | Husher. |
| 5,115,193 | 5/1992 | Bean et al. ............................... 336/179 |
| 5,220,145 | 6/1993 | Cecil et al.. |
| 5,288,968 | 2/1994 | Cecil. |
| 5,321,225 | 6/1994 | Boyer. |
| 5,402,096 | 3/1995 | Harris. |
| 5,412,172 | 5/1995 | Ichikawa et al. ..................... 219/86.41 |
| 5,493,093 | 2/1996 | Cecil. |
| 5,504,297 | 4/1996 | Stiebel et al.. |
| 5,514,846 | 5/1996 | Cecil et al.. |
| 5,614,109 | 3/1997 | Cecil. |
| 5,632,912 | 5/1997 | Cecil. |
| 5,645,738 | 7/1997 | Cecil. |

OTHER PUBLICATIONS

J.J. Curcuri, "Sensor for Determining Electrode Position in an Automated Resistance Spot Welding System," submitted to GMI Engineering & Management Institute on Apr. 21, 1997 (generally catalogued at least about 6 months after the submission date).

A. Stiebel, et al., "Monitoring and Control of Spot Weld Operations," SAE Technical Paper Series 860579, Feb., 1986.

B. Hodges, "Position Sensing for Hydraulic Cylinders," Presented at Sensors Expo West, Mar. 3, 1993.

"A Guide to Position Feedback Cylinder Technology," Bimba Manufacturing Company, date unknown, U.S.A.

"Bimba: Leaders in Actuation," Bimba Manufacturing Company, date unknown, U.S.A.

"Bimba Position Feedback Cylinder," Bimba Manufacturing Company, date unknown, U.S.A.

"Bimba Port Mounted Flow Controls," Bimba Manufacturing Company, date unknown, U.S.A.

"DC Fastar Position Transducer," Data Instruments, Nov., 1995, Acton, Massachusetts.

"DC Fastar Application Note," Data Instruments, Jul., 1994, Acton, Massachusetts.

"DC Hydrastar Position Transducer," Data Instruments, Nov. 1995, Acton, Massachusetts.

"Hydrastar Application Note," Data Instruments, Jul., 1993, Acton, Massachusetts.

"Hydrastar User Instructions," Data Instruments, Jun., 1993, Acton, Massachusetts.

"MystR," Data Instruments, Apr., 1994, Acton, Massachusetts.

"VRVT Linear Displacement Transducers," Penny+Giles, 1997.

*Primary Examiner*—Patrick Ryan
*Assistant Examiner*—Anjan Dey
*Attorney, Agent, or Firm*—Brooks & Kushman P.C.

[57] ABSTRACT

A welding system for real-time weld quality detection during resistance welding of a workpiece has a sensor assembly including a winding and a core mounted generally coaxially within the cylinder of the welding gun. A piston and piston rod assembly are mounted for coaxial movement within the cylinder. The piston rod has an end protruding from the cylinder for affixing an electrode thereto. Axial movement of the piston rod relative to the cylinder causes axial movement of the core relative to the winding to vary a length of core and winding overlap. The sensor assembly produces an output signal based on the length of core and winding overlap to indicate piston rod position relative to the cylinder. Weld control logic receiving the sensor assembly output controls welding of the workpiece in real-time.

24 Claims, 3 Drawing Sheets

WELDING SYSTEM WITH A REAL-TIME WELD QUALITY DETECTION SENSOR

TECHNICAL FIELD

The present invention relates to a welding system for real-time weld quality detection during resistance welding of a workpiece.

BACKGROUND ART

In resistance welding, there are four primary factors involved in making a good weld. These factors are current, pressure applied, time duration of welding power application, and electrical contact area with the workpiece. Resistance welding joins the workpieces at the faying or contacting surfaces with the heat obtained from workpiece resistance to the flow of electric current through an electric circuit which includes at least one electrode. The current applied through the workpieces is usually in the thousands of amperes, and may be as much as 100,000 amperes. One electrode acts as the current source, while the ground may be through another electrode or through a fixture that holds the workpiece.

Conventional welding systems that do not monitor weld quality in real-time must utilize empirical control methods for the welding process. As the electrode deteriorates due to the forming of many spot welds, the electrode tip contact area increases. This causes the current per unit area to decrease thereby increasing the time and current required to form a good weld, and if uncompensated results in an underdeveloped weld nugget. Further, deteriorating electrode conditions affect the heat loss that occurs during the weld time. As a result, the conditions for forming a spot weld are continuously changing from weld to weld, requiring some type of compensation in order to produce quality welded parts.

One method that has traditionally been used to compensate for these deteriorating conditions is to form extra spot welds to assure structural integrity. This becomes very costly when mass producing parts, and is therefore an undesirable solution. In many situations, such as weld nut and balance weight welding, the part is too small to have redundant welds and a bad weld results in a product failure.

Another method that has been traditionally employed is a stepper method. The percent heat applied during the weld time is increased in steps after predetermined numbers of welds are formed. The electrodes are replaced after the percent heat has been increased to a predetermined maximum percent heat, and the allowed number of welds for that step have been made.

An existing real-time welding system is described in U.S. Pat. No. 4,542,277, issued to Dimitrios G. Cecil, which is hereby incorporated by reference in its entirety. In the existing system, an externally mounted transducer such as a linear variable differential transformer (LVDT) is mounted to the side of the cylinder shell. The LVDT core moves with the cylinder electrode in side-by-side spaced apart parallel relationship. Because a conventional LVDT has a length to sensing range ratio of about two to one, the LVDT must be calibrated so that the fit up position of the parts to be welded is in the linear region of the LVDT output. Side mounting the LVDT to the cylinder facilitates LVDT calibration, to the linear region because the LVDT can be re-positioned without much difficulty. Accordingly, the LVDT may be appropriately positioned based on the thickness of the workpieces to be welded so that the LVDT output is in its linear region at electrode fit up.

Although welding systems with externally mounted sensors (including LVDTs) have been used in many applications that have been successful, many times in the industrial workplace there are space constraints for mounting the welding gun assembly. In particular, it may be necessary to mount the assembly adjacent walls and other machinery. The externally mounted sensor restricts the available mounting arrangements for the cylinder. Still further, the external sensor is subject to harsh environmental conditions. Further, contact with an operator or anything else in the workplace area may potentially subject the sensor to miscalibration.

SUMMARY OF THE INVENTION

It is, therefore, an object of the present invention to provide a real-time welding system utilizing a cylinder integrated position sensor.

It is another object of the present invention to provide a welding gun utilizing a cylinder integrated position sensor.

In carrying out the above objects and other objects and features of the present invention, a welding system for real-time weld quality detection during resistance spot welding of a workpiece is provided. The welding system comprises a piston and piston rod assembly mounted for axial movement within a cylinder. The piston rod has an end protruding from the cylinder with an electrode affixed to the piston rod end. A sensor assembly includes a winding and core mounted generally coaxially within the cylinder. Axial movement of the piston rod relative to the cylinder causes axial movement of the core relative to the winding to vary a length of core and winding overlap. The sensor assembly produces an output signal based on the length of core and winding overlap to indicate piston rod position relative to the cylinder. Weld control logic receives the sensor assembly output, and controls welding of the workpiece in real-time.

Further, in carrying out the present invention, a welding gun for use in a welding system for real-time weld quality detection during resistance welding of a workpiece is provided. The welding gun comprises a cylinder, a piston and piston rod assembly and a sensor assembly including a winding and a core. The sensor assembly produces an output based on the length of core and winding overlap to indicate piston rod position relative to the cylinder to allow weld control logic receiving the sensor assembly output to control welding of the workpiece in real-time.

The advantages associated with embodiments of the present invention are numerous. For example, a welding gun of the present invention utilizing a cylinder integrated position sensor allows greater freedom in mounting arrangements for the welding gun assembly. Further, the cylinder protects the sensor from the harsh environment conditions present in the welding area. Still further, embodiments of the present invention employ sensor assemblies having length to sensing range ratios sufficiently small enough to make cylinder integrated position sensing in resistance welding applications possible.

The objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
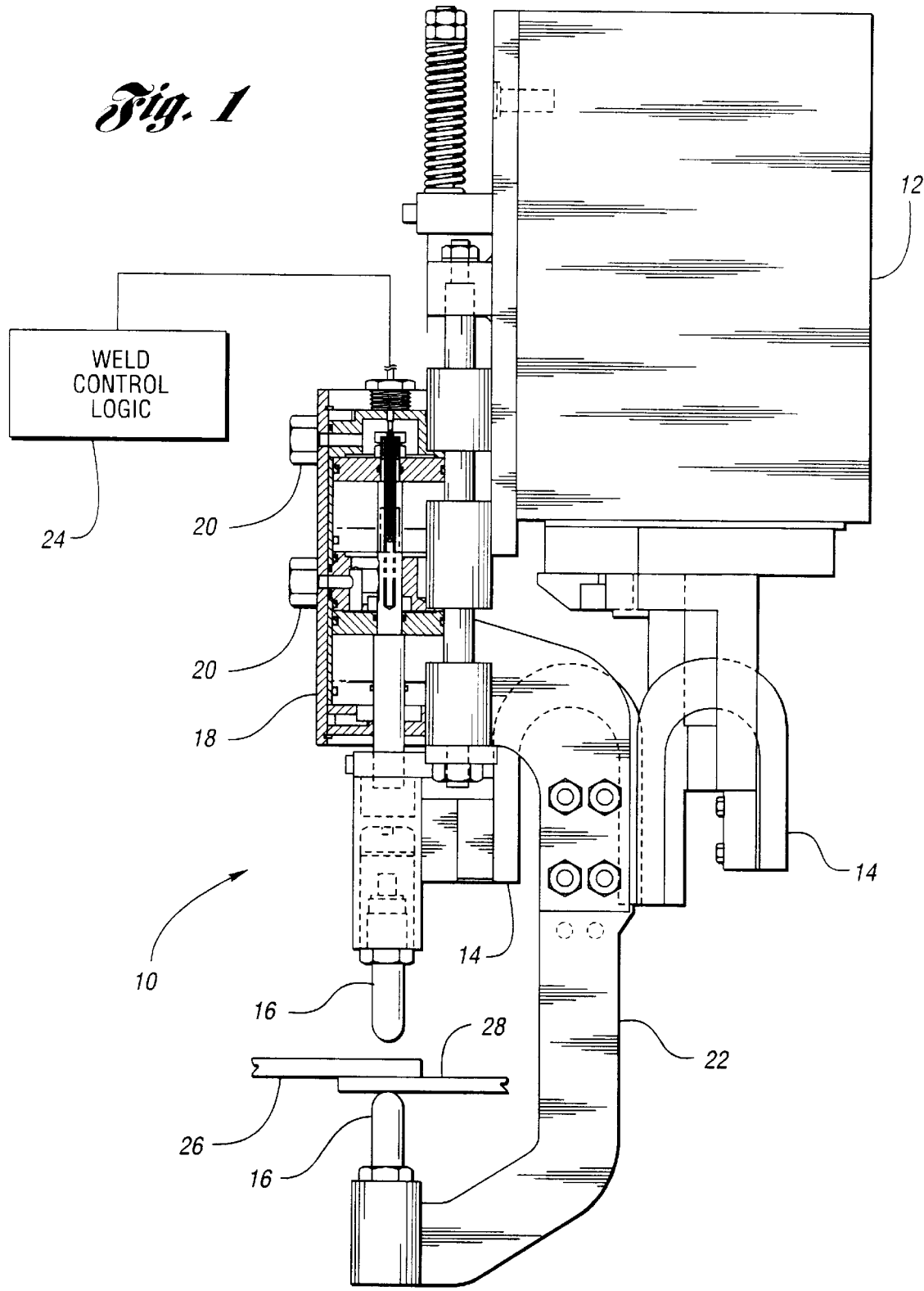
FIG. 1 is a welding system of the present invention, showing a welding gun connected to a transformer and having a C-type electrode configuration.

With reference to FIG. 1, a welding system of the present invention is generally indicated at 10. A transformer 12 generally includes a primary and a secondary circuit. The primary side of the transformer is high voltage and low current. In a single phase construction, the primary circuit is connected to one phase of an industrial or 440 volt, 60 Hz power supply. The primary coil of the transformer is made up of many turns of thin wire. The secondary coil of the transformer has relatively few turns of a heavy gauge wire to accommodate the high amperage current needed for welding.

Current carrying shunts 14 are connected to the secondary side of the transformer 12 and with electrodes 16 for supplying weld power to electrodes 16. In the exemplary welding gun and transformer assembly illustrated, the rolling shunts 14 which are connected to the secondary terminals of the transformer 12 are made up of 50 pieces of 7.75 to 9.75 inch lengths of copper which are about 1.5 inches wide and 0.010 inches thick.

As shown, electrodes 16 are mounted for reciprocation on a self-equalizing cylinder 18. Cylinder 18 may be either air or hydraulically actuated to close electrodes 16 on a pair of workpieces (not specifically shown) to be welded. Air or hydraulic lines are connected to ports 20 on the side of cylinder 18, and are pressurized to urge electrodes 16 together or apart.

Although welding system 10 employs a C-type welding gun formed by self-equalizing cylinder 18 and C-shaped arm 22, embodiments of the present invention may be employed in many different types of welding guns in addition to the C-type welding gun illustrated in FIG. 1. For example, the welding gun may be constructed with a single electrode, with the other electrode of the electrode pair mounted to a separate welding gun. Further, for example, the welding gun may be constructed as a single electrode welding gun, with the other electrode formed by a ground connection to the workpiece that completes the welding circuit. That is, more particularly, the workpiece itself functions as the other electrode.

Still further, it is to be appreciated that while welding system 10 is of the trans-gun type with the welding gun mounted directly to transformer 12, there are many other configurations for connecting the welding gun to transformer 12. Alternative to the rolling shunts shown in FIG. 1, traditional shunts may be used such that the transformer is spaced apart from the welding gun.

The welding gun is connected to weld control logic 24 to provide real-time weld quality detection during resistance welding of workpieces. Weld control logic 24 communicates with an in-cylinder position sensor to monitor electrode position during welding operations. Weld control logic 24 may be executed by an industrial PC or a Programmable Logic Controller (PLC) or other device, as desired. The control logic 24 is programmable to suit the weld schedule needs of the selected workpieces 26 and 28 to be welded.

Figure 2:
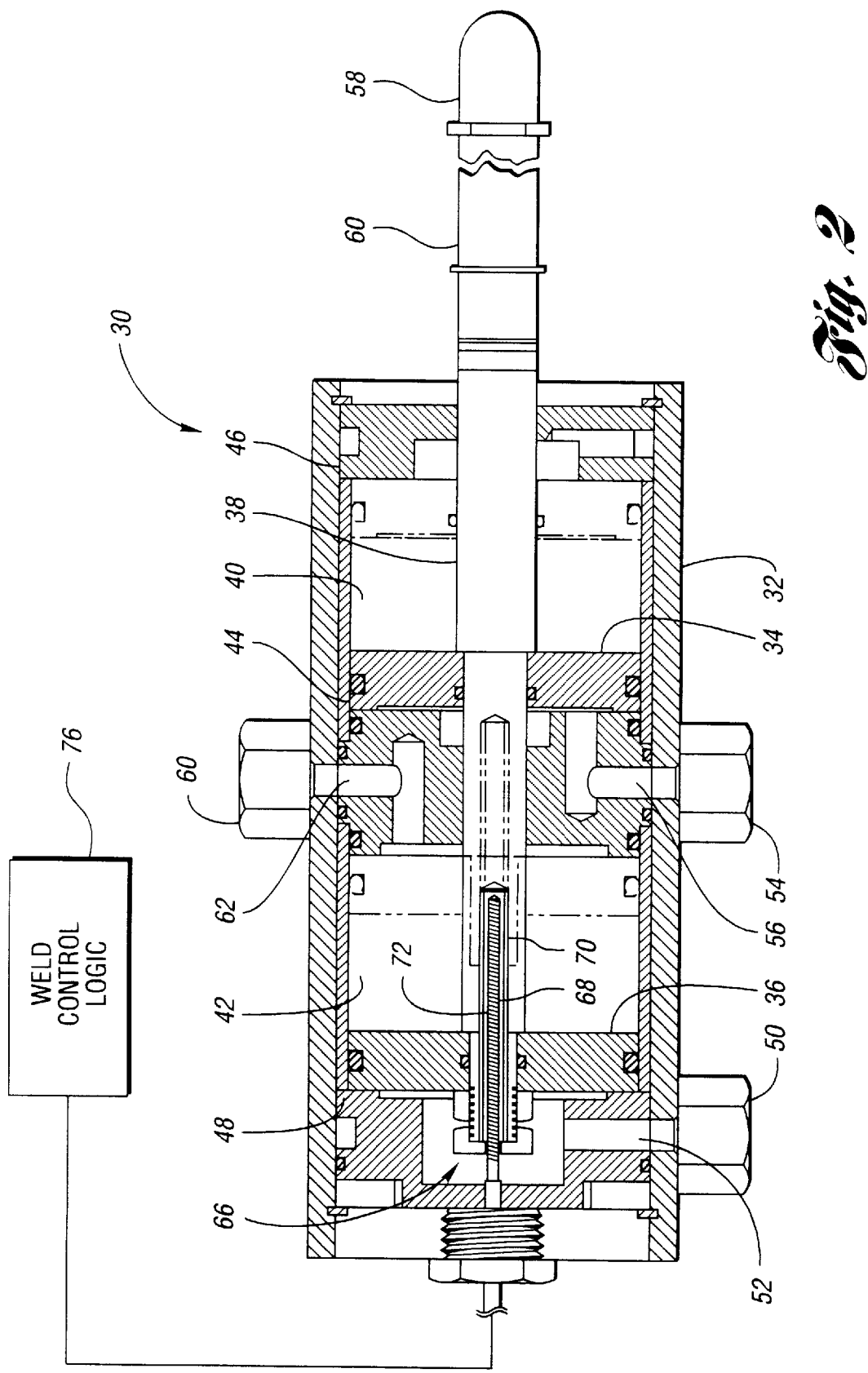
FIG. 2 is an enlarged cross-sectional view illustrating a welding gun of the present invention.

With reference to FIG. 2, a welding gun 30 of the present invention for use in a welding system for real-time weld quality detection during resistance welding of a workpiece. The welding gun includes a cylinder 32. First and second pistons 34 and 36, respectively, and a piston rod 38 cooperate to form a piston and piston rod assembly within the cylinder 32. First and second pistons 34 and 36, respectively, are disposed in first and second chambers 40 and 42, respectively, within cylinder 32. Although cylinder 32 is illustrated as a dual-piston type cylinder assembly, a single-piston type cylinder assembly may be employed, if desired. The first and second chambers 40 and 42, respectively, are separated by a center gland 44. First piston 34 is constrained within first chamber 40 by center gland 44 in the rearward direction, and by front stop 46 in the forward direction. Second piston 36 is constrained within the second chamber 42 in the forward direction by center gland 44, and in the rearward direction by rear stop 48. The terms "forward" and "rearward" are used herein for convenience in reference only, and are not meant to be limiting. The term "forward" means toward the end of the cylinder that is closest to the electrode connected to the piston rod. The term "rearward" means the cylinder end that is furthest from the electrode connected to the piston rod.

An extend port 50 connects to a fluid source to supply fluid pressure through conduit 52 in rear stop 48 and urge piston rod 38 toward the forward, or extended, position. Supplemental extend port 54 connects to a fluid source and supplies fluid pressure through conduit 56 in center gland 44 to assist in urging piston rod 38 toward the forward, or extended, position. A retract port 60 connects to a fluid source to supply fluid pressure through conduit 62 in center gland 44 and urge piston rod 38 toward the rearward, or retracted, position. As shown in FIG. 2, piston rod 38 is in the retracted position. Piston rod 38 is shown in the extended position in phantom. An electrode 58 is affixed to piston rod 38 at forward end 60 of piston rod 38. Axial movement of piston rod 38 relative to cylinder 32 causes axial movement of electrode 58 toward and away from the workpiece (not shown).

A sensor assembly 66 includes a winding 68 and a core 70. Winding 68 and core 70 are mounted generally coaxially within cylinder 32 such that axial movement of piston rod 38 relative to cylinder 32 causes axial movement of core 70 relative to winding 68 to vary a length of core and winding overlap. Preferably, winding 68 and core 70 are disposed at least partially in an axial hole 72 extending at least partially along the length of piston rod 38. Further, in a preferred embodiment, core 70 is substantially cylindrical and is affixed to piston rod 38 such that core 70 encircles winding 68. Winding 68 is then wound on a long probe extending from the rearward end of cylinder 32 into hole 72, and through core 70. Because the sensor wiring is connected to winding 68, the preferred embodiment is advantageous in that winding 68 remains stationary during welding operations, while core 70 is the moving member of the sensor. Preferably, piston rod 38 is made of metal to provide electrode magnetic shielding of the sensor assembly.

The sensor assembly produces an output signal based on the length of core and winding overlap to indicate piston rod position relative to cylinder 32. The sensor assembly output signal allows weld control logic 76 to receive the sensor assembly output and control welding of the workpiece in real-time.

It is to be appreciated that a real-time welding system made in accordance with the present invention may utilize an in-cylinder electrode position sensor for numerous weld quality control features. For example, electrode position is preferably monitored to control when weld power is turned on and when weld power is subsequently turned off. Further, electrode position may be monitored to determine whether or not parts are within tolerance at workpiece fit-up. One example of a welding system in which embodiments of the present invention may be employed is described in U.S. Pat. No. 4,542,277, issued to Dimitrios G. Cecil, and incorporated by reference previously. Further examples of welding systems in which embodiments of the present invention may be employed are described in U.S. Pat. Nos. 4,684,778; 4,861,959; 5,220,145; 5,288,968; 5,493,093; 5,514,846; 5,614,109; 5,632,912; and 5,645,738, all naming Dimitrios G. Cecil as an inventor, and all of which are hereby incorporated by reference in their entirety.

It is to be appreciated that welding gun 24 may employ any one of several different sensor assembly designs to provide position indicative output signals to weld control logic 76.

Figure 3:
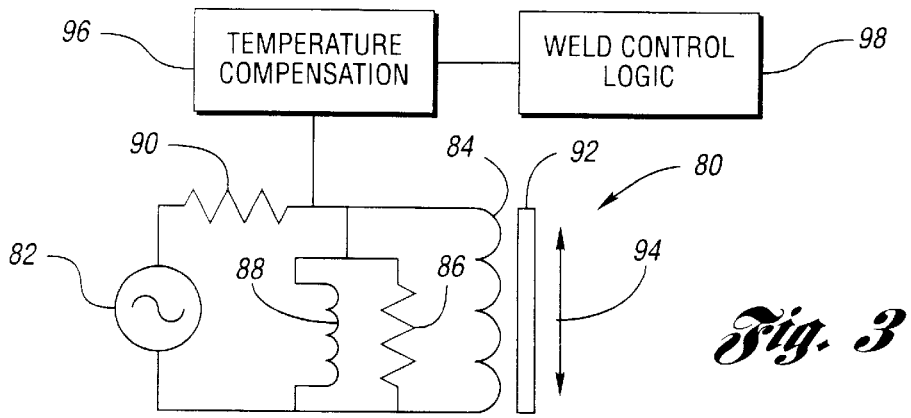
FIG. 3 is a schematic diagram illustrating a preferred embodiment of the sensor assembly.

With reference to FIG. 3, a preferred embodiment of the sensor assembly is generally indicated at 80. A sinusoidal source 82 excites sensor assembly winding 84. Winding 84 has core-loss that includes eddy-current loss 86 and hysteresis loss 88. Sinusoidal source 82 is coupled to winding 84 through a resistor 90. In the preferred embodiment, a sensor assembly core 92 is made of a magnetic material. Core 92 moves relative to winding 84 as indicated by arrow 94 when the piston rod moves relative to the cylinder as previously described. Preferably, core 92 is made of a ferromagnetic material such as a nickel iron alloy. It is to be appreciated that other ferromagnetic materials, or even some ferrimagnetic materials, may have sufficiently high permeability for use in the preferred embodiment of the present invention.

Sinusoidal source 82 is of a frequency is sufficiently high such that the eddy-current losses within winding 84 dominate over the hysteresis losses. For example, a sinusoidal source having a frequency between about 10 kHz and about 20 kHz may be sufficient to cause the eddy-current losses, depicted as resistor 86, to dominate over the hysteresis losses, depicted by inductor 88.

The sensor output signal is taken at resistor 90, and preferably is coupled to a temperature compensation circuit 96, and ultimately to weld control logic 98. Temperature compensation circuit 96 influences the sensor output to compensate for any gain and/or phase variation due to temperature effects.

It is to be appreciated that, in the preferred embodiment, the sensor output signal is based on eddy-current losses within the of core. At appropriate sinusoidal source excitation frequencies, the eddy-current losses vary substantially linearly with the length of core and winding overlap. Magnetic core, eddy-current loss measuring sensors, such as described above for the preferred embodiment of the welding gun, are further described in U.S. Pat. No. 4,954,776, issued to Husher, which is hereby incorporated by reference in its entirety.

It is to be appreciated that the above description of a magnetic core sensor assembly is exemplary, and is not meant to be limiting. Other configurations for magnetic core sensors suitable for use within a welding gun of the present invention may be contemplated by one of ordinary skill in the art.

Alternatively, sensor assembly 80 may have a core that is made of a non-magnetic conducting material. A non-magnetic conducting core sensor assembly operates in a different manner than a magnetic core sensor assembly. For example, a non-magnetic conducting material such as aluminum or copper may be used to form core 92. Accordingly, sinusoidal source 82 should be excited at a higher frequency, for example, about 50 Hz to about 200 kHz is an appropriate range for excitation. In such a non-magnetic conducting core sensor assembly, the sensor output signal is preferably based on effective inductive reactance of winding 92. The effective inductive reactance of winding 92 varies with the length of core and winding overlap. More particularly, non-magnetic conducting core 92 develops eddy-currents in the region of overlap with winding 84. These eddy-currents are sufficient to attenuate magnetic flux through the region of core winding overlap. Flux attenuation is believed to occur due to conductor skin-effect. Of course, there may be other configurations for a non-magnetic conducting core sensor assembly that may be contemplated by one of ordinary skill in the art. A sensor assembly in which core eddy-currents attenuate effective inductive reactance of the winding is described in U.S. Pat. No. 4,667,158 issued to Redlich which is hereby incorporated by reference in its entirety.

Still further, sensors for determining electrode position in resistance welding systems, including the alternative embodiment eddy-current effective inductive reactance type sensor described immediately above, are described in "Sensor for Determining Electrode Position in an Automated Resistance Spot Welding System" authored by Jeremy J. Curcuri, and submitted to GMI Engineering & Management Institute on Apr. 21, 1997 (generally catalogued at least about six months after the submission date), which is hereby incorporated by reference in its entirety.

Figure 4:
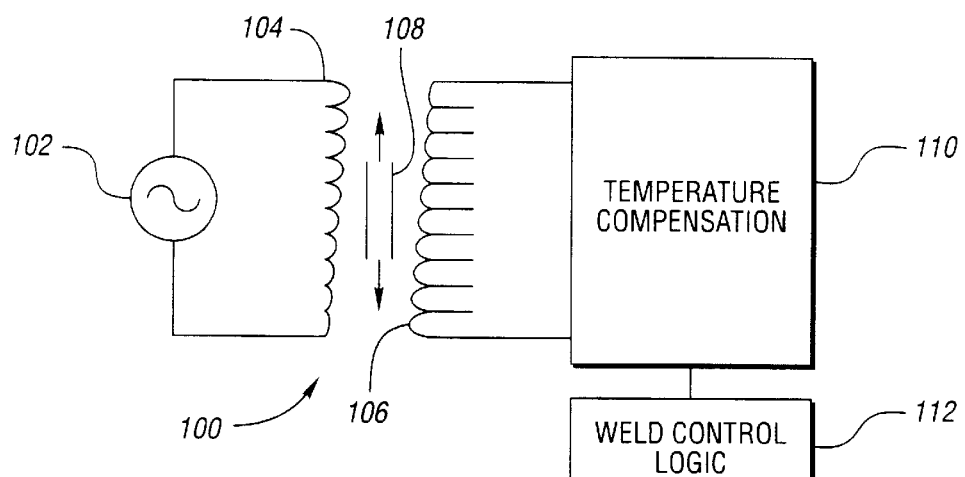
FIG. 4 is a schematic diagram illustrating an alternative embodiment of the sensor assembly.

With reference to FIG. 4, another alternative embodiment of the present invention is generally indicated at 100. In this alternative embodiment, a sensor assembly includes a sinusoidal source 102 on the primary side of a transformer formed by primary winding 104, secondary winding 106, and magnetic core 108. Windings 104 and 106 together form the sensor winding. Magnetic core 108 is moveable relative to the windings to form a differential transformer and is the sensor assembly core. At least one of the windings 104 and 106 has a flux per unit length that varies as a function of axial position along that winding. As shown, both winding 104 and winding 106 have a flux per unit length that varies as a function of axial position. The flux per unit variations may occur in a variety of different ways.

One method to vary the flux per unit length of the winding is to provide larger diameter turns at one end than at the other end of the winding, with a continuous variation of the turn area along the length of the winding. A monotonic variation is preferred, but other variations are possible. Further, and preferred for this alternative embodiment, the flux per unit length may be varied by varying the turns per unit length of the winding. Accordingly, one end of the winding may have a high number of turns per unit length, while the other end of the winding has a lower number of turns per unit length, with the ratio varying along the length of the winding. Monotonic variation is preferred, but is not required.

Movement of magnetic core 108 relative to the windings 104 and 106 varies the effective flux coupling between the windings to produce a variable differential transformer. Preferably, the windings 104 and 106 are configured such that the variation is linear.

The sensor assembly produces an output signal based on the effective flux coupling between winding 104 and winding 106 through core 108 to indicate piston rod position relative to the cylinder. A sensor output signal allows weld control logic 112 to receive the sensor assembly output and control welding of the workpiece in real time. As in the other embodiments, a temperature compensation circuit 110 is preferably employed to compensate for any gain and phase variations due to temperature variations.

It is to be appreciated that in the alternative embodiment of the present invention illustrated in FIG. 4, windings 104 and 106 may have a flux per unit length that varies as a function of axial position along the respective winding in a variety of different ways. It is to be appreciated that such flux per unit length variations, however implemented, reduce the length to sense ratio of the differential transformer to significantly less than the common configuration ratio of about two to one. It is possible that precise windings may allow the length to sense ratio to approach one to one. Accordingly, this reduction of the length to sense ratio allows such a sensor to be implemented in a welding gun or welding system of the present invention.

Figure 5:
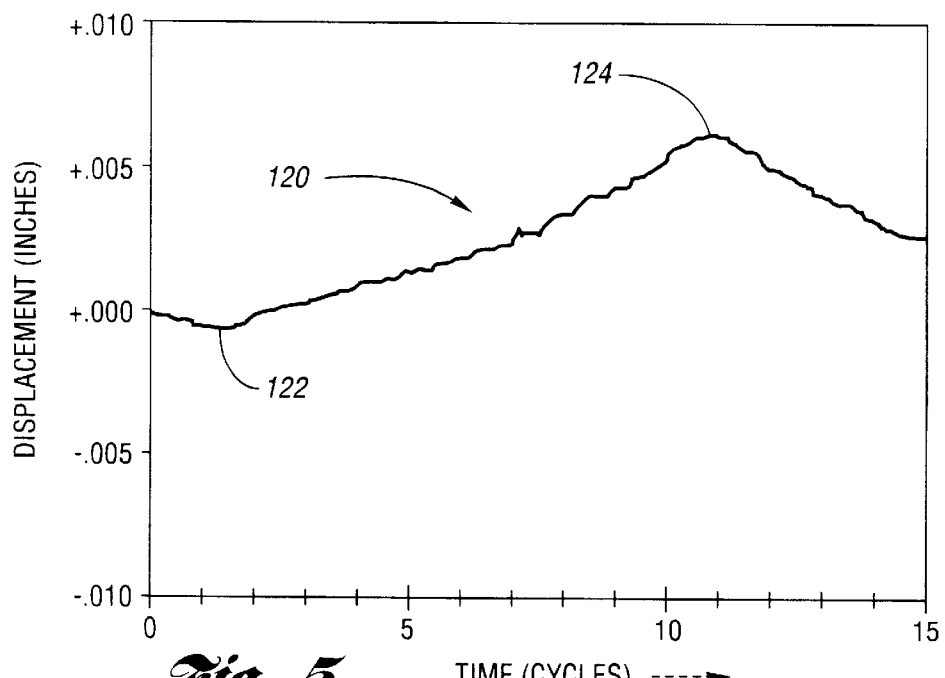
FIG. 5 is a graph depicting real-time weld control in accordance with the present invention.

With reference to FIG. 5, a graph depicting real-time weld control is generally indicated at 120. The graph depicts the forming of an expansion type weld, in which sufficient weld nugget growth is necessary for a good weld. At time zero, welding power is supplied to the welding electrode or electrodes to form a resistance welding circuit through the workpiece. The electrodes begin to penetrate the workpieces and reach a maximum penetration at 122. Thereafter, the electrodes begin to expand due to workpiece expansive forces, and reach a maximum expansion at 124. After maximum expansion has been reached, when this maximum expansion exceeds the minimum required expansion for a good weld, welding power is turned off in accordance with real-time weld power control facilitated by embodiments of the present invention. Such real-time welding control allows the consistent forming of good welds in varying workpiece and/or workplace conditions.

While the best mode for carrying out the invention has been described in detail, those familiar with the art to which this invention relates will recognize various alternative designs and embodiments for practicing the invention as defined by the following claims.

What is claimed is:

1. A welding system for real-time weld quality detection during resistance welding of a workpiece, the welding system comprising:

a cylinder;

a piston and piston rod assembly mounted for axial movement within the cylinder, the piston rod having an end protruding from the cylinder;

an electrode affixed to the piston rod end for movement therewith;

a sensor assembly including a winding arrangement and a core, the winding arrangement and the core being mounted generally coaxially within the cylinder such that axial movement of the piston rod relative to the cylinder causes axial movement of the core relative to the winding arrangement to vary a length of core and winding arrangement overlap, the core and the winding arrangement being configured to produce a full range linear output signal based on the length of core and winding arrangement overlap with signal being formed by a single component that varies over the full range and defines piston rod position relative to the cylinder as the core moves over a full length of the winding arrangement; and weld control logic for receiving the sensor assembly output to control welding of the workpiece in real-time.

2. A welding gun for use in a welding system for real-time weld quality detection during resistance welding of a workpiece, the welding gun comprising:

a cylinder;

a piston and piston rod assembly mounted for axial movement within the cylinder, the piston rod having an end for affixing an electrode thereto, the end protruding from the cylinder; and a sensor assembly including a winding arrangement and a core, the winding arrangement and the core being mounted generally coaxially within the cylinder such that axial movement of the piston rod relative to the cylinder causes axial movement of the core relative to the winding arrangement to vary a length of core and winding arrangement overlap, wherein the core and the winding arrangement are configured to produce a full range linear output signal based on the length of core and winding arrangement overlap with the signal being formed by a single component that varies over the full range and defines piston rod position relative to the cylinder as the core moves over a full length of the winding arrangement to allow weld control logic receiving the sensor assembly output to control welding of the workpiece in real-time.

3. A welding gun for use in a welding system for real-time weld quality detection during resistance welding of a workpiece, the welding gun comprising:

a cylinder;

a piston and piston rod assembly mounted for axial movement within the cylinder, the piston rod having an end for affixing an electrode thereto, the end protruding from the cylinder; and a sensor assembly including a winding and a core, the winding and the core being mounted generally coaxially within the cylinder such that axial movement of the piston rod relative to the cylinder causes axial movement of the core relative to the winding to vary a length of core and winding overlap, wherein the sensor assembly produces an output signal based on the length of core and winding overlap to indicate piston rod position relative to the cylinder to allow weld control logic receiving the sensor assembly output to control welding of the workpiece in real-time, and wherein the sensor assembly core is made of a magnetic material such that the sensor output is a full range linear output that varies with magnetic material and winding overlap.

4. The welding gun of claim 3 wherein the sensor assembly core is made of a nickel iron alloy.

5. The welding gun of claim 3 wherein the winding is excited at a frequency between about 10 kHz and about 20 kHz during sensor operation.

6. The welding gun of claim 3 wherein the sensor output signal is further based on eddy-current losses within the core, the eddy-current losses varying with the length of core and winding overlap.

7. A welding gun for use in a welding system for real-time weld quality detection during resistance welding of a workpiece, the welding gun comprising:

a cylinder;

a piston and piston rod assembly mounted for axial movement within the cylinder, the piston rod having an end for affixing an electrode thereto, the end protruding from the cylinder; and a sensor assembly including a winding and a core, the winding and the core being mounted generally coaxially within the cylinder such that axial movement of the piston rod relative to the cylinder causes axial movement of the core relative to the winding to vary a length of core and winding overlap, wherein the sensor assembly produces an output signal based on the length of core and winding overlap to indicate piston rod position relative to the cylinder to allow weld control logic receiving the sensor assembly output to control welding of the workpiece in real-time, and wherein the sensor assembly core is made of a non-magnetic conducting material such that the sensor output is a full range linear output that varies with non-magnetic material and winding overlap.

8. The welding gun of claim 7 wherein the sensor assembly core is made of aluminum.

9. The welding gun of claim 7 wherein the sensor assembly core is made of copper.

10. The welding gun of claim 7 wherein the winding is excited at a frequency between about 50 kHz and about 200 kHz during sensor operation.

11. The welding gun of claim 7 wherein the sensor output signal is further based on effective inductive reactance of the winding, the effective inductive reactance of the winding varying with the length of core and winding overlap.

12. The welding gun of claim 2 further comprising:
a temperature compensation circuit coupled to the sensor assembly, the temperature compensation circuit influencing the sensor output signal to compensate for temperature effects on component resistivity.

13. The welding gun of claim 2 wherein the piston rod is made of metal and has an axial hole extending at least partially along the length of the piston rod with the sensor assembly at least partially disposed in the hole to provide electromagnetic shielding.

14. A welding gun for use in a welding system for real-time weld quality detection during resistance welding of a workpiece, the welding gun comprising:
a cylinder;
a piston and piston rod assembly mounted for axial movement within the cylinder, the piston rod having an end for affixing an electrode thereto, the end protruding from the cylinder; and
a sensor assembly including a winding and a core, the winding and the core being mounted generally coaxially within the cylinder such that axial movement of the piston rod relative to the cylinder causes axial movement of the core relative to the winding to vary a length of core and winding overlap,
wherein the sensor assembly produces an output signal based on the length of core and winding overlap to indicate piston rod position relative to the cylinder to allow weld control logic receiving the sensor assembly output to control welding of the workpiece in real-time, and the winding is affixed to the cylinder, and the core is substantially cylindrical and is affixed to the piston rod such that the core encircles the winding.

15. A welding gun for use in a welding system for real-time weld quality detection during resistance welding of a workpiece, the welding gun comprising:
a cylinder;
a piston and piston rod assembly mounted for axial movement within the cylinder, the piston rod having an end for affixing an electrode thereto, the end protruding from the cylinder;
a first winding having first and second ends, the first winding being axially mounted within the cylinder;

a second winding having first and second ends, the second winding being axially mounted within the cylinder and being positioned so as to be flux coupled to the first winding, the first and second windings being configured to produce the flux coupling to each other with a flux coupling per unit length that varies as a function of axial position with respect to the first and second windings; and
a magnetic core mounted within the cylinder such that axial movement of the piston rod relative to the cylinder causes axial movement of the core relative to the first and second windings to vary the effective flux coupling between the first and second windings,
wherein the sensor assembly produces an output signal based on the effective flux coupling to indicate piston rod position relative to the cylinder to allow weld control logic receiving the sensor assembly output to control welding of the workpiece in real-time.

16. A welding gun for use in a welding system for real-time weld quality detection during resistance welding of a workpiece, the welding gun comprising:
a cylinder;
a piston and piston rod assembly mounted for axial movement within the cylinder, the piston rod having an end for affixing an electrode thereto, the end protruding from the cylinder;
a first winding having first and second ends, the first winding being axially mounted within the cylinder and having a flux per unit length that varies as a function of axial position along the first winding;
a second winding having first and second ends, the second winding being axially mounted within the cylinder and being positioned so as to be flux coupled to the first winding; and
a magnetic core mounted within the cylinder such that axial movement of the piston rod relative to the cylinder causes axial movement of the core relative to the first and second windings to vary the effective flux coupling between the first and second windings,
wherein the sensor assembly produces an output signal based on the effective flux coupling to indicate piston rod position relative to the cylinder to allow weld control logic receiving the sensor assembly output to control welding of the workpiece in real-time, and the second winding has a flux per unit length that varies as a function of axial position along the second winding.

17. The welding gun of claim 15 further comprising:
a temperature compensation circuit coupled to the sensor assembly, the temperature compensation circuit influencing the sensor output signal to compensate for temperature effects on component resistivity.

18. The welding gun of claim 15 wherein the piston rod is made of metal and has an axial hole extending at least partially along the length of the piston rod with the sensor assembly at least partially disposed in the hole to provide electromagnetic shielding.

19. A welding gun for use in a welding system for real-time weld quality detection during resistance welding of a workpiece, the welding gun comprising:
a cylinder;
a piston and piston rod assembly mounted for axial movement within the cylinder, the piston rod having an end for affixing an electrode thereto, the end protruding from the cylinder;
a first winding having first and second ends, the first winding being axially mounted within the cylinder and having a flux per unit length that varies as a function of axial position along the first winding;

a second winding having first and second ends, the second winding being axially mounted within the cylinder and being positioned so as to be flux coupled to the first winding; and a magnetic core mounted within the cylinder such that axial movement of the piston rod relative to the cylinder causes axial movement of the core relative to the first and second windings to vary the effective flux coupling between the first and second windings, wherein the sensor assembly produces an output signal based on the effective flux coupling to indicate piston rod position relative to the cylinder to allow weld control logic receiving the sensor assembly output to control welding of the workpiece in real-time, and the first and second windings are affixed to the cylinder, and the core is substantially cylindrical and is affixed to the piston rod such that the core encircles the first and second windings.

20. A welding gun for use in a welding system for real-time weld quality detection during resistance welding of a workpiece, the welding gun comprising:

a cylinder;

a piston and piston rod assembly mounted for axial movement within the cylinder, the piston rod having an end for affixing an electrode thereto, the end protruding from the cylinder;

a first winding having first and second ends, the first winding being axially mounted within the cylinder and having a flux per unit length that varies as a function of axial position along the first winding;

a second winding having first and second ends, the second winding being axially mounted within the cylinder and being positioned so as to be flux coupled to the first winding; and a magnetic core mounted within the cylinder such that axial movement of the piston rod relative to the cylinder causes axial movement of the core relative to the first and second windings to vary the effective flux coupling between the first and second windings, wherein the sensor assembly produces an output signal based on the effective flux coupling to indicate piston rod position relative to the cylinder to allow weld control logic receiving the sensor assembly output to control welding of the workpiece in real-time, and the sensor output signal is further based on an effective transformation ratio between the first and second windings.

21. The welding system of claim 1 wherein the winding arrangement is a single winding.

22. The welding gun of claim 2 wherein the winding arrangement is a single winding.

23. The welding gun of claim 2 wherein the sensor assembly core is made of a magnetic material, and wherein the sensor output signal is further based on eddy-current losses within the core, the eddy-current losses varying with the length of core and winding arrangement overlap.

24. The welding gun of claim 2 wherein the sensor assembly has a length-to-sense ratio of at most about one and one-half to one.

* * * * *